(12) United States Patent
Nakagawa et al.

(10) Patent No.: US 10,611,349 B2
(45) Date of Patent: Apr. 7, 2020

(54) VEHICULAR COLLISION AVOIDANCE CONTROL DEVICE AND VEHICULAR COLLISION AVOIDANCE CONTROL METHOD

(71) Applicants: ADVICS CO., LTD., Kariya-shi (JP); TOYOTA JIDOSHA KABUSHIKI KAISHA, Toyota-shi (JP)

(72) Inventors: Yusuke Nakagawa, Nagoya (JP); Yosuke Ohmori, Kariya (JP); Wataru Ike, Toyota (JP)

(73) Assignees: ADVICS CO., LTD., Kariya-shi (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 124 days.

(21) Appl. No.: 15/744,369

(22) PCT Filed: Jul. 12, 2016

(86) PCT No.: PCT/JP2016/070618
§ 371 (c)(1),
(2) Date: Jan. 12, 2018

(87) PCT Pub. No.: WO2017/014116
PCT Pub. Date: Jan. 26, 2017

(65) Prior Publication Data
US 2018/0201239 A1     Jul. 19, 2018

(30) Foreign Application Priority Data
Jul. 17, 2015     (JP) .................. 2015-143481

(51) Int. Cl.
*B60T 7/22*     (2006.01)
*B60T 7/12*     (2006.01)
(Continued)

(52) U.S. Cl.
CPC .............. *B60T 7/22* (2013.01); *B60T 7/042* (2013.01); *B60T 7/12* (2013.01); *B60T 8/171* (2013.01);
(Continued)

(58) Field of Classification Search
CPC ....................................................... B60T 7/22
See application file for complete search history.

(56) References Cited

U.S. PATENT DOCUMENTS

| 6,922,624 B2* | 7/2005 | Isaji ...................... B60T 7/12 340/435 |
| 7,018,004 B2* | 3/2006 | Chen ...................... B60T 7/22 188/1.11 R |

(Continued)

FOREIGN PATENT DOCUMENTS

| JP | 2008-55994 A | 3/2008 |
| JP | 2008-296887 A | 12/2008 |

(Continued)

OTHER PUBLICATIONS

International Search Report dated Sep. 13, 2016 in PCT/JP2016/070618 filed Jul. 12, 2016.

(Continued)

*Primary Examiner* — Bao Long T Nguyen
*Assistant Examiner* — Michael A Berns
(74) *Attorney, Agent, or Firm* — Oblon, McClelland, Maier & Neustadt, L.L.P.

(57) ABSTRACT

A vehicular collision avoidance control device includes: a collision avoidance control unit that receives a vehicle deceleration rate that is an actual deceleration rate of a traveling vehicle and obtains a first desired deceleration rate for avoiding collision with an obstacle based on the received vehicle deceleration rate, a relative distance to the obstacle, and a target relative distance; and a brake control unit that obtains a desired deceleration rate for controlling a brake device by performing first control based on the received vehicle deceleration rate and the first desired deceleration rate and performing second control based on the first desired
(Continued)

deceleration rate and stops the first control upon detection of a brake operation performed by a driver.

5 Claims, 6 Drawing Sheets

(51) Int. Cl.
    *B60T 7/04*     (2006.01)
    *B60T 8/171*     (2006.01)
    *B60T 8/32*     (2006.01)
    *G08G 1/16*     (2006.01)

(52) U.S. Cl.
    CPC .............. *B60T 8/3255* (2013.01); *G08G 1/16* (2013.01); *B60T 2201/022* (2013.01); *B60T 2220/04* (2013.01)

(56) References Cited

U.S. PATENT DOCUMENTS

| | | | | |
|---|---|---|---|---|
| 7,280,902 | B2 * | 10/2007 | Seki | B60T 7/22 701/70 |
| RE41,410 | E * | 6/2010 | Seki | B60T 7/22 180/244 |
| 8,401,757 | B2 * | 3/2013 | Tokimasa | B60T 7/18 701/70 |
| 8,577,550 | B2 * | 11/2013 | Lu | B60W 10/06 340/435 |
| 9,079,571 | B2 * | 7/2015 | Trost | B60T 7/22 |
| 2005/0182549 | A1 | 8/2005 | Seki | |
| 2010/0138123 | A1 | 6/2010 | Tokimasa et al. | |
| 2013/0110370 | A1 | 5/2013 | Inomata | |
| 2016/0280190 | A1 * | 9/2016 | Franz | G08G 1/166 |

FOREIGN PATENT DOCUMENTS

| | | |
|---|---|---|
| JP | 5267963 B1 | 8/2013 |
| JP | 2013-212772 A | 10/2013 |
| WO | 2013/065089 A1 | 5/2013 |

OTHER PUBLICATIONS

Extended European Search Report dated Jun. 27, 2018 in Patent Application No. 16827676.4.

* cited by examiner

VEHICULAR COLLISION AVOIDANCE CONTROL DEVICE AND VEHICULAR COLLISION AVOIDANCE CONTROL METHOD

CROSS-REFERENCE TO RELATED APPLICATIONS

This application is national stage application of International Application No. PCT/JP2016/070618, filed Jul. 12, 2016, which designates the United States, incorporated herein by reference, and which claims the benefit of priority from Japanese Patent Application No. 2015-143481, filed Jul. 17, 2015, the entire contents of which are incorporated herein by reference.

TECHNICAL FIELD

The present invention relates to a vehicular collision avoidance control device and a vehicular collision avoidance control method.

BACKGROUND ART

Recently, automotive controllers which implement collision avoidance control (pre-crash control system: PCS) for avoiding a collision of a vehicle with a forward vehicle existing ahead of the vehicle in a traveling direction of the vehicle by alerting a driver or by performing a avoidance control such as an automatic brake, or the like, when a distance between the vehicle and the forward vehicle becomes a certain distance or shorter have been known (see, for example, Patent Document 1).

To improve control accuracy on a target deceleration rate in the collision avoidance control, it is preferred that the automotive controller perform feedback control using an actual deceleration rate of the vehicle (vehicle deceleration rate).

When the driver performs a brake operation to put a brake on the vehicle while the collision avoidance control is being performed, the automotive controller may optionally perform control with adding a deceleration rate generated by feedback control of adjusting a desired deceleration rate for the collision avoidance control based on an actual vehicle deceleration rate and a desired deceleration rate required by the driver's brake operation.

CITATION LIST

Patent Literature

Patent Document 1: Japanese Patent Application Laid-open No. 2008-296887

SUMMARY OF INVENTION

Problem to be Solved by the Invention

However, this configuration, in which a deceleration rate generated by applying, as feedback, an actual vehicle deceleration rate to a desired deceleration rate for the collision avoidance control is added to a desired deceleration rate required by the driver's brake operation, delays application of a change in the desired deceleration rate required by the driver's brake operation to the actual vehicle deceleration rate. After that, the vehicle deceleration rate, which was applied as feedback in the collision avoidance control, is corrected by the feedback control and the corrected deceleration rate is then reflected in the resulting braking force. This configuration delays responsiveness to, for example, a brake operation, and results in fluctuations of the vehicle deceleration rate. From the driver's point of view, although the driver further performs a brake operation while the collision avoidance control is being performed, a desired braking performance will not be achieved.

In view of the foregoing, it is an object of the present invention to provide a vehicular collision avoidance control device and a vehicular collision avoidance control method that can achieve a desired braking performance even when the driver performs a brake operation while collision avoidance control is being performed.

Means for Solving Problem

A vehicular collision avoidance control device according to the present invention comprises a collision avoidance control unit configured to receive a vehicle deceleration rate that is an actual deceleration rate of a traveling vehicle, and obtain a first desired deceleration rate for avoiding collision with an obstacle based on the received vehicle deceleration rate, a relative distance to the obstacle, and a target relative distance; and a brake control unit configured to obtain a desired deceleration rate for controlling a brake device by performing first control based on the received vehicle deceleration rate and the first desired deceleration rate and performing second control based on the first desired deceleration rate and stop the first control upon detection of a brake operation performed by a driver. This configuration, for example, can achieve a desired braking performance even when the driver performs a brake operation while the collision avoidance control is being performed.

In the vehicular collision avoidance control device, when the brake operation is no longer detected, the brake control unit resumes the first control. This configuration, for example, can implement an appropriate collision avoidance control when the driver performs and then stops a brake operation while the collision avoidance control is being performed.

In the vehicular collision avoidance control device, upon detection of the brake operation, the brake control unit compares a second desired deceleration rate that is a desired deceleration rate required by the brake operation with a third desired deceleration rate that is a deceleration rate generated by applying the vehicle deceleration rate as feedback to the first desired deceleration rate, and controls the brake device by using a greater one of the second desired deceleration rate and the third desired deceleration rate. This configuration, for example, ensures avoiding collision with the obstacle when a braking force applied by the driver's brake operation during the collision avoidance control is small.

A vehicular collision avoidance control method according to the present invention comprises receiving a vehicle deceleration rate that is an actual deceleration rate of a traveling vehicle and obtaining a first desired deceleration rate for avoiding collision with an obstacle based on the received vehicle deceleration rate, a relative distance to the obstacle, and a target relative distance; and obtaining a desired deceleration rate for controlling a brake device by performing first control based on the received vehicle deceleration rate and the first desired deceleration rate and performing second control based on the first desired deceleration rate and stopping the first control upon detection of a brake operation performed by a driver. This configuration, for example, can achieve a desired braking performance even when the driver performs a brake operation while the collision avoidance control is being performed.

DESCRIPTION OF EMBODIMENTS

An exemplary embodiment of the present invention will be described below. Configurations of the embodiment described below and functions and results (effects) brought by the configurations are presented for illustrative purposes only. The present invention can be implemented by other configurations than those disclosed in the embodiment below. With the present invention, at least one of the effects (including derivative effects) that are brought by the configurations can be obtained.

The following describes, as an example, a case in which units of a vehicle 100 are controlled while the vehicle 100 is moving forward so that the vehicle 100 can avoid collision with an anterior obstacle.

First Embodiment

Figure 1:
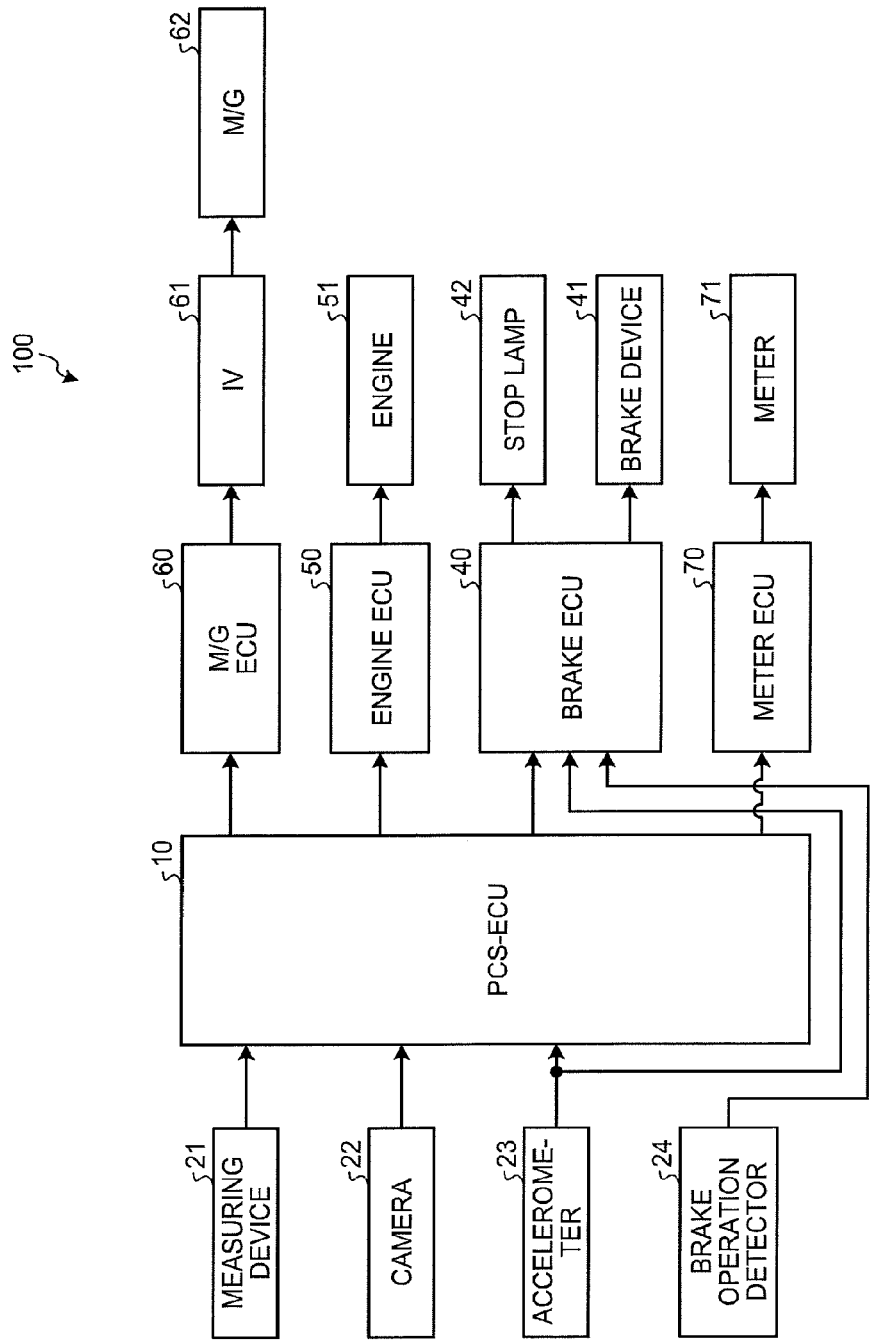
FIG. 1 is an exemplary schematic view illustrating a configuration of a vehicle in which a vehicular collision avoidance control device according to embodiments is installed.

FIG. 1 is an exemplary schematic view illustrating a configuration of the vehicle 100 according to a first embodiment. As illustrated in FIG. 1, the vehicle 100 includes, for example, an engine 51, a motor/generator (M/G) 62, and a brake device 41. The engine 51 and the motor/generator 62 accelerate the vehicle 100. In this regard, the engine 51 and the motor/generator 62 may be referred to as a driving source or driving system. The vehicle 100 may include at least the engine 51 or the motor/generator 62 as its driving source. An acceleration rate of the vehicle 100 refers to an increase in velocity over time (time derivative) of the vehicle 100 moving forward, and a deceleration rate of the vehicle 100 refers to a decrease in velocity over time (time derivative) of the vehicle 100 moving forward. In this regard, an acceleration rate is also a negative deceleration rate, and a deceleration rate is also a negative acceleration rate. In other words, when breaking force of the brake device 41 decreases, that is, when a deceleration rate decreases, an acceleration rate increases, whereas, when propulsion force of the engine 51 or the motor/generator 62 decreases, that is, when an acceleration rate decreases, a deceleration rate increases.

The vehicle 100 includes a pre-crash safety electronic control unit (PCS-ECU) 10 and a brake ECU 40. The PCS-ECU 10 and the brake ECU 40 are an example of a collision avoidance control device.

When an obstacle is detected ahead of the vehicle 100 while the vehicle 100 is traveling, the PCS-ECU 10 determines whether there is a possibility of collision with the obstacle. If the PCS-ECU 10 determines that there is a possibility of the collision, the PCS-ECU 10 gives instructions to a brake ECU 40, an engine ECU 50, an M/G ECU 60, and so forth, that control the brake device 41, the engine 51, the motor/generator 62, and so forth, to avoid collision with the obstacle. The PCS-ECU 10 is an example of the collision avoidance control device. In the present embodiment, although the PCS-ECU 10 gives instructions for controlling the acceleration rate or the deceleration rate of the vehicle 100, that is, for controlling propulsion force or braking force, the PCS-ECU 10 may also give instructions for controlling steering of the vehicle 100.

The PCS-ECU 10 includes a control unit such as a central processing unit (CPU), a controller, or the like, and storage units such as a read only memory (ROM), a random access memory (RAM), a flash memory, and so on. The storage units may store therein, for example, a computer program for causing the PCS-ECU 10 to operate, data for use in arithmetic processing of the PCS-ECU 10, etc.

The vehicle 100 includes a measuring device 21, camera 22, an accelerometer 23, and a brake operation detector 24.

The measuring device 21 wirelessly and contactlessly measures a distance to the obstacle and is, for example, a radar device, a sonar device, or the like. The PCS-ECU 10 acquires data indicating the distance to the obstacle from the measuring device 21. In this case, the data indicating the distance may be numeric data indicating the distance itself or data indicating a value corresponding to the distance.

The camera 22 is a digital camera including an imaging device such as a charge-coupled device (CCD) or a CMOS image sensor (CIS). The camera 22 can output video data at a certain frame rate. The PCS-ECU 10 may acquire data representing an image captured by the camera 22, and acquire a distance to the obstacle using the image data.

The accelerometer 23 detects an acceleration rate in the fore-and-aft directions of the vehicle (fore-and-aft acceleration rate), and outputs a signal indicating the fore-and-aft acceleration rate.

Various sensors, which are not illustrated, are installed in the vehicle 100 and data indicating sensing results is input from the sensors to the PCS-ECU 10. The sensors installed in the vehicle 100 may include sensors outputting sensing results of the state of the vehicle 100. Examples of the sensors outputting sensing results of the state of the vehicle 100 include a speed sensor, a gyro sensor, and so forth, in addition to the above-described accelerometer 23.

The sensors installed in the vehicle 100 may include sensors outputting sensing results of an amount of operation or an operation requirement on an operating unit being to be operated by the driver. Examples of the operating unit to be operated by the driver include an accelerator pedal, a brake pedal, a brake handle, a steering wheel, switches, and so on.

In the case where the operating unit is a brake pedal, the brake operation is detected by the brake operation detector 24. The brake operation detector 24 is provided to the brake pedal to detect an operation on the brake pedal by the driver. Examples of the brake operation detector 24 include a brake switch, a brake pedal stroke sensor, a leg-power sensor, or the like. The brake switch outputs a brake operation signal indicating whether the driver operates the brake pedal. Specifically, the brake switch outputs an on-state (high) brake operation signal when the brake pedal is operated, and outputs an off-state (low) brake operation signal when the brake pedal is not operated. The brake pedal stroke sensor detects an amount of movement (stroke) of the brake pedal operated by the driver and transmits a detected signal. The leg-power sensor detects a brake pedal force or an actuation force of the brake pedal when the brake pedal is pressed, and transmits a detected signal. The brake operation signal and the detected signals are output to the brake ECU 40.

The sensors installed in the vehicle 100 may include sensors outputting sensing results of the states of devices installed in the vehicle 100. Examples of the devices installed in the vehicle 100 include the brake device 41, the engine 51, the motor/generator 62, an inverter (IV) 61, a steering system, a suspension system, and so forth. Examples of physical quantities to be detected by the sensors installed in the vehicle 100 include distance, displacement, velocity, acceleration, rotational speed, angle, angular velocity, angular acceleration, and so forth. The PCS-ECU 10 may receive numerical data indicating each physical quantity itself, and may receive data indicating a value corresponding to a level or intensity of each physical quantity.

The data to be input to the PCS-ECU 10 may be digital data, analogue data such as non-digitalized potential, or the like, data that does not correspond to a value of a physical quantity but corresponds to on/off states or individual phases, or the like.

To perform collision avoidance control, the PCS-ECU 10 calculates an estimated time for the vehicle 100 to collide with an anterior obstacle, that is, calculates a time to collision (TTC). In the simplest case, let the distance to the obstacle be D and the relative velocity of the vehicle 100 to the obstacle be Vr, and the PCS-ECU 10 can calculate TTC by an expression TTC=D/Vr. TTC may be calculated in consideration of a relative acceleration of the obstacle and a deceleration rate of the vehicle 100.

The PCS-ECU 10 calculates a share of the acceleration rate or the deceleration rate of the vehicle 100, which is calculated by the brake ECU 40, to be allocated to the brake device 41, the engine 51, and the motor/generator 62. How much share to be allocated to each device depends on, for example, the situation of the vehicle 100. The PCS-ECU 10 transmits, to the brake ECU 40, the engine ECU 50, and the M/G ECU 60, data indicating the share of the acceleration rate or the deceleration rate allocated to the respective devices.

The brake ECU 40 calculates an acceleration rate or the deceleration rate of the vehicle 100 from the detected signal received from the accelerometer 23. The brake ECU 40 controls the brake device 41 to achieve the calculated acceleration rate or the calculated deceleration rate. The engine ECU 50 controls the engine 51 to achieve an acceleration rate or a deceleration rate set by the PCS-ECU 10. The M/G ECU 60 controls the inverter 61 to cause the motor/generator 62 to operate to achieve the acceleration rate or the deceleration rate set by the PCS-ECU 10.

The brake ECU 40 can control stop lamps 42 mounted on the rear end of the vehicle 100 to emit light. Illuminating the stop lamps 42 may be a warning display to the periphery of the vehicle 100, for example, to the vehicles behind, and so on. A meter ECU 70 can control a meter 71 mounted on, for example, an instrument panel to display a warning. Display output of the meter 71 may be a warning display to the driver or passengers in a vehicle cabin. The stop lamps 42 and the meter 71 may be referred to as warning output devices, output devices, warning devices, display output devices, or the like. An audible output may be output from a sound output device, which is not illustrated. The sound output device is, for example, a speaker, a buzzer, or the like, and may be referred to as a warning output device, an output device, a warning device, or the like.

Figure 2:
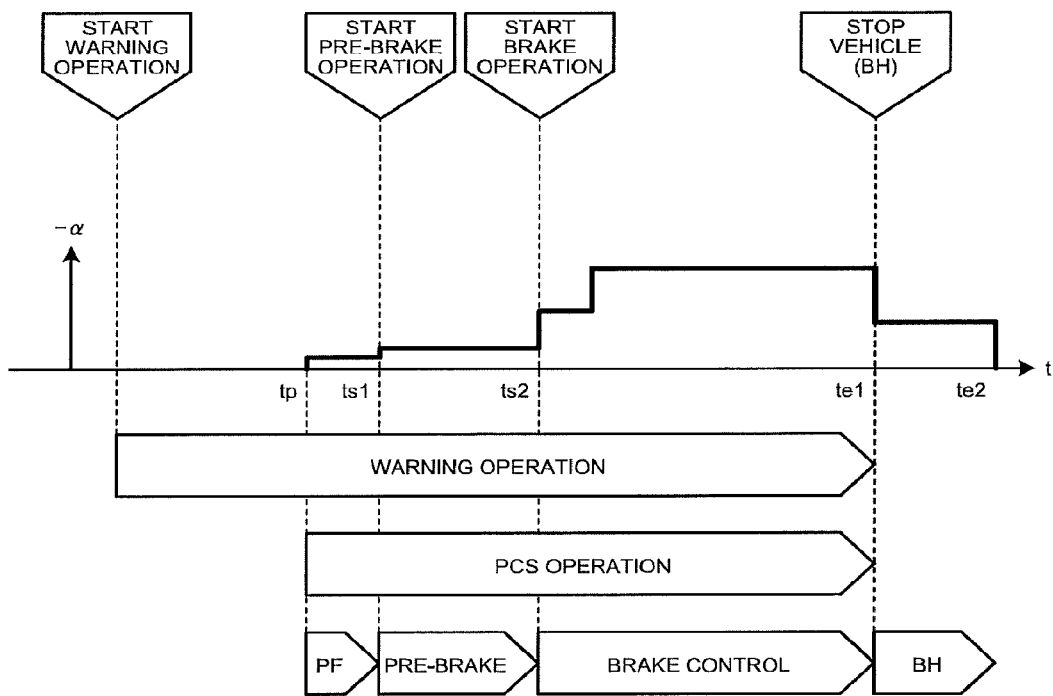
FIG. 2 is an exemplary view illustrating transition of control states of the vehicular collision avoidance control device according to the embodiments.

FIG. 2 illustrates an example of transition of control states in an automatic collision avoidance control without a brake operation performed by the driver. With regard to the graph included in FIG. 2, the horizontal axis represents time and the vertical axis represents a deceleration rate, and a represents an acceleration rate.

The PCS-ECU 10 calculates TTC at certain time intervals in accordance with data acquired while the vehicle 100 is traveling. In accordance with the values of TTC, the PCS-ECU 10 starts collision avoidance control, shifts a phase of the collision avoidance control to the next phase, and terminates the collision avoidance control. In other words, the PCS-ECU 10 monitors the situations relating to collision avoidance by using TTC.

First, the PCS-ECU 10 starts a warning operation by using, for example, the meter 71 or a speaker.

Next, the PCS-ECU 10 instructs the brake ECU 40 to activate a pump (not illustrated) of the brake device 41. The brake ECU 40 performs control as instructed to clear a gap between a brake pad and a brake disc or a drum. This operation may be referred to as prefill (PF).

The PCS-ECU 10 instructs the brake ECU 40 to start a pre-brake operation. Specifically, the PCS-ECU 10 transmits an instruction signal to the brake ECU 40 to illuminate the stop lamps 42. The PCS-ECU 10 instructs the brake ECU 40 to achieve, for example, a minimum deceleration rate (braking force) accompanied with illuminating the stop lamps 42, and the brake ECU 40 controls the brake device 41 as instructed. In the present embodiment, the main purpose of the pre-brake operation is to illuminate the stop lamps 42. The pre-brake operation may be performed to achieve a certain deceleration rate that prompts the driver in the vehicle behind to perform a deceleration operation.

The PCS-ECU 10 then instructs the brake ECU 40 to start brake control for avoiding collision. Specifically, the PCS-ECU 10 instructs the brake ECU 40 to change the velocity of the vehicle 100 at a certain deceleration rate, that is, to achieve a certain braking force, and the brake ECU 40 controls the brake device 41 as instructed. In the brake control, the deceleration rate (braking force) may be increased in stages.

When the vehicle 100 stops without colliding with the obstacle, the PCS-ECU 10 instructs the brake ECU 40 to keep the vehicle 100 stopping for a certain period of time, and the brake ECU 40 controls the brake device 41 as instructed. This operation may be referred to as brake hold (BH).

Figure 3:
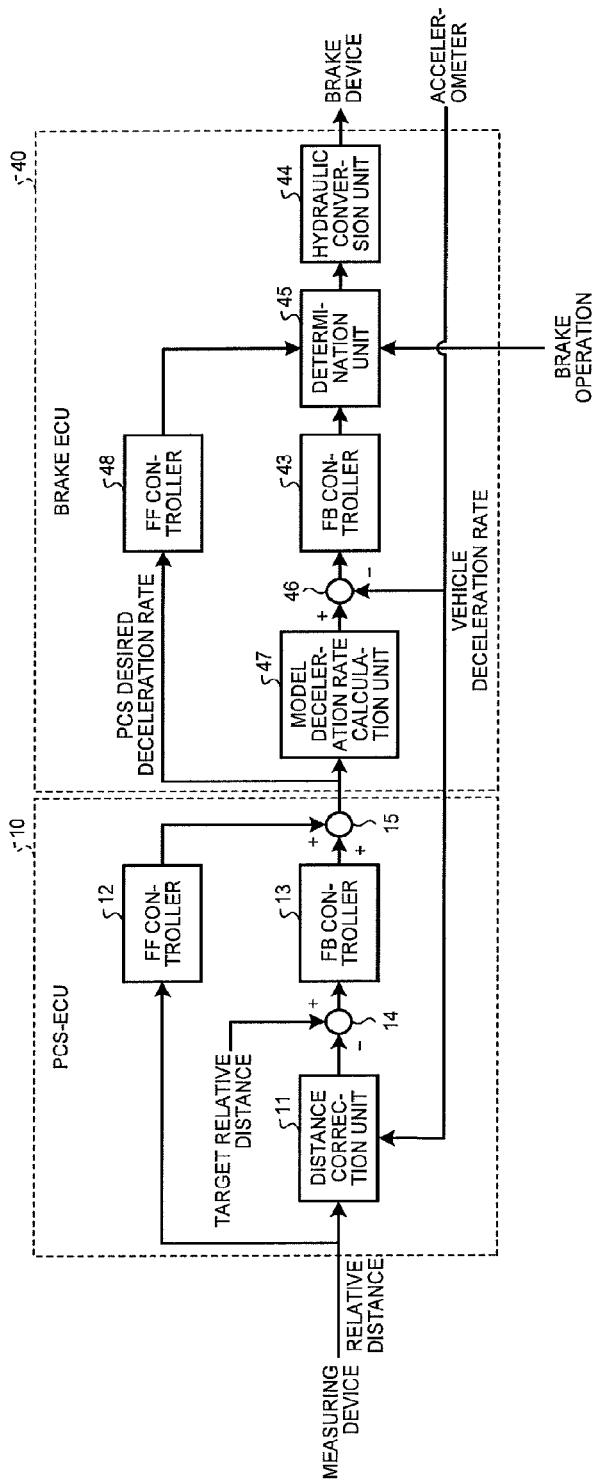
FIG. 3 is an exemplary schematic block diagram illustrating the vehicular collision avoidance control device according to the embodiments.

The PCS-ECU 10 and the brake ECU 40 according to the present embodiment will be described in detail below. FIG. 3 is a block diagram illustrating functional configurations of the PCS-ECU 10 and the brake ECU 40 according to the first embodiment. As illustrated in FIG. 3, for example, the PCS-ECU 10 mainly includes a distance correction unit 11, adders 14 and 15, a FB controller 13, and a FF controller 12. The PCS-ECU 10 feeds back a vehicle deceleration rate of the vehicle, and obtains a PCS desired deceleration rate that is a deceleration rate needed for avoiding collision by performing feedback control and feedforward control. The feedback control is performed by the distance correction unit 11, the adder 14, and the FB controller 13 by using a vehicle deceleration rate, a relative distance, and a target relative distance. The feedforward control is performed by the FF controller 12 to which the relative velocity is input.

The PCS-ECU 10 may be an independent ECU or may be embedded in an ECU of a system installed in the vehicle. The PCS-ECU 10 can implement various functions by performing processing in accordance with a computer program installed and loaded thereon. In other words, the PCS-ECU 10 can function, for example, as the distance correction unit 11, the adders 14 and 15, the FB controller 13, the FF controller 12, and so forth, by performing processing in accordance with the computer program. At least one of the functions of the above-described units may be implemented by hardware.

The PCS-ECU 10 receives, from the measuring device 21, a relative distance to an obstacle such as a vehicle traveling ahead of the vehicle 100, or the like. The received relative distance is converted into a deceleration rate by the FF controller 12 and the converted value is output to the adder 15.

The received relative distance is also input to the distance correction unit 11. The distance correction unit 11 receives, as feedback, an actual deceleration rate of the vehicle (actual vehicle deceleration rate) calculated by the brake ECU 40 from the detected signal of the accelerometer 23. The distance correction unit 11 corrects the relative distance using a distance corresponding to the vehicle deceleration rate received as feedback and then outputs the corrected relative distance. The adder 14 calculates a difference between the corrected relative distance and a target relative distance that has been set as a target value of the relative distance, and then outputs the difference of the distances. The FB controller 13 calculates a deceleration rate from the received difference of the distances, and outputs the calculated deceleration rate.

The adder 15 outputs a value calculated by adding an output indicating the deceleration rate from the FF controller 12 and an output indicating the deceleration rate from the FB controller 13 to the brake ECU 40 as a PCS desired deceleration rate. The PCS desired deceleration rate is a deceleration rate needed for avoiding collision, and is an example of a first desired deceleration rate. As described above, in the PCS-ECU 10, the PCS desired deceleration rate needed for avoiding collision is calculated by feeding back a current deceleration rate of the vehicle.

As illustrated in FIG. 3, for example, the brake ECU 40 mainly includes a model deceleration rate calculation unit 47, an adder 46, an FB controller 43, an FF controller 48, a determination unit 45, and a hydraulic conversion unit 44. The brake ECU 40 receives a detected signal of the accelerometer 23 and calculates an actual deceleration rate of the vehicle (actual vehicle deceleration rate) from the detected signal. The calculated vehicle deceleration rate is also input to the PCS-ECU 10 as described above.

The brake ECU 40 may be an independent ECU or may be embedded in an ECU of a system installed in the vehicle. The brake ECU 40 can implement various functions by performing processing in accordance with a computer program installed and loaded thereon. In other words, the brake ECU 40 can function, for example, as the model deceleration rate calculation unit 47, the adder 46, the FB controller 43, the FF controller 48, the determination unit 45, the hydraulic conversion unit 44, and so forth, by performing processing in accordance with the computer program. At least one of the functions of the above-described units may be implemented by hardware.

The brake ECU 40 feeds back the vehicle deceleration rate of the vehicle, and obtains a brake target deceleration rate that is a deceleration rate needed for braking by performing feedback control (an example of first control) and feedforward control (an example of second control). The feedback control is performed by the model deceleration rate calculation unit 47, the adder 46, and the FB controller 43 by using the vehicle deceleration rate and the PCS desired deceleration rate. The feedforward control is performed by the FF controller 48 to which the PCS desired deceleration rate is input.

The brake ECU 40 receives the PCS desired deceleration rate from the PCS-ECU 10. The FF controller 48 performs a certain calculation on the received PCS desired deceleration rate and outputs the calculated value to the determination unit 45.

The received PCS desired deceleration rate is also input to the model deceleration rate calculation unit 47. The model deceleration rate calculation unit 47 outputs, for example, a model deceleration rate in which input values of the staged PCS desired deceleration rate are set as certain values. The adder 46 subtracts the vehicle deceleration rate input as feedback from the model deceleration rate. The FB controller 43 performs a certain calculation on the subtracted value, and outputs the calculated value to the determination unit 45.

The determination unit 45 receives a detected signal of a brake operation by a driver, which is detected by the brake operation detector 24, and calculates a driver deceleration rate that is a deceleration rate caused by the brake operation by the driver. The driver deceleration rate is an example of a second desired deceleration rate.

The determination unit 45 receives an output indicating a deceleration rate from the FF controller 48 and an output indicating a deceleration rate from the FB controller 43, and adds these outputs.

Specifically, the determination unit 45 sequentially stores, in an internal memory, the sum of the output indicating a deceleration rate from the FF controller 48 and the output indicating a deceleration rate from the FB controller 43 upon receiving outputs from the FF controller 48 and the FB controller 43, and transmits the sum to the hydraulic conversion unit 44.

The sum of the output indicating a deceleration rate from the FF controller 48 and the output indicating a deceleration rate from the FB controller 43 corresponds to a deceleration rate generated by applying the vehicle deceleration rate as feedback to the PCS desired deceleration rate, and is referred to as a brake target deceleration rate. The brake target deceleration rate is a deceleration rate that must be achieved by the brake device 41. The hydraulic conversion unit 44 converts the received brake target deceleration rate into a hydraulic instruction that causes the brake device 41 to achieve the brake target deceleration rate, and transmits this hydraulic instruction to the brake device 41.

Suppose that the driver performs a brake operation and a braking force is applied by the operation. The brake ECU of the conventional technology performs feedback control on a deceleration rate calculated by adding a driver deceleration rate that is a desired deceleration rate required by the brake operation and the brake target deceleration rate. This configuration in the case of brake operation, in some cases, reduces the deceleration rate for the collision avoidance control compared to a case without a brake operation.

In other words, in the feedback control performed in the collision avoidance control, a deceleration rate needed for avoiding collision is output as an object to be controlled. When the feedback control is performed on the sum of the brake target deceleration rate and the driver deceleration rate, the collision avoidance control accounts for a smaller proportion in the deceleration rate needed for avoiding collision. Accordingly, the deceleration rate needed for avoiding collision is reduced by the driver deceleration rate.

Upon application of a driver's brake operation, the amount of control (deceleration rate) needed for collision avoidance control varies, and accordingly, the target value varies, which the feedback control cannot follow. In other words, this configuration delays application of a change in the driver deceleration rate required by the driver's brake operation to the actual vehicle deceleration rate. Subsequently, the vehicle deceleration rate, which is applied as feedback in the collision avoidance control, is corrected by the feedback control and the corrected deceleration rate is then reflected in the resulting deceleration rate. This configuration significantly delays the responsiveness to the brake operation, and results in fluctuations of the vehicle deceleration rate.

In this regard, the conventional collision avoidance control, in some cases, while the collision avoidance control is being performed, fails to achieve a desired braking performance when the driver further performs a brake operation, or fails to quickly recover the deceleration rate when the driver suddenly eases up on the brake operation.

To prevent such situations, in the present embodiment, when the driver performs a brake operation to cause a braking force, the determination unit 45 detects the driver's operation and stops the feedback control performed by the model deceleration rate calculation unit 47, the adder 46, and the FB controller 43 in the brake ECU 40. Specifically, upon reception of a brake operation, the determination unit 45 adds the sum (brake target deceleration rate) of the outputs of the FB controller 43 and the FF controller 48 stored in the memory at the time of reception of the brake operation and the driver deceleration rate required by the driver's brake operation, and outputs the new sum to the hydraulic conversion unit 44. The determination unit 45 stops, in this manner, the feedback control performed by the model deceleration rate calculation unit 47, the adder 46, and the FB controller 43.

In the present embodiment, when the driver performs a brake operation while the collision avoidance control is being performed, the driver deceleration rate required by the driver's brake operation is added to the deceleration rate needed for collision avoidance control and the feedback control is stopped. This configuration can prevent weakening of a deceleration rate needed for avoiding collision or prevent delays in responsiveness, and can achieve a brake performance required by the driver.

When the driver stops performing the brake operation while the feedback control is stopped and the braking force caused by the driver is not applied, the determination unit 45 resumes the feedback control performed by the model deceleration rate calculation unit 47, the adder 46, and the FB controller 43 in the brake ECU 40. Specifically, the determination unit 45 resumes the operation of sequentially storing, in the internal memory, the sum (brake target deceleration rate) of the output indicating a deceleration rate from the FB controller 48 and the output indicating a deceleration rate from the FB controller 43 upon receiving the outputs from the FF controller 48 and the FB controller 43, and transmitting the sum to the hydraulic conversion unit 44. The determination unit 45 resumes, in this manner, the feedback control performed by the model deceleration rate calculation unit 47, the adder 46, and the FB controller 43.

Figure 4:
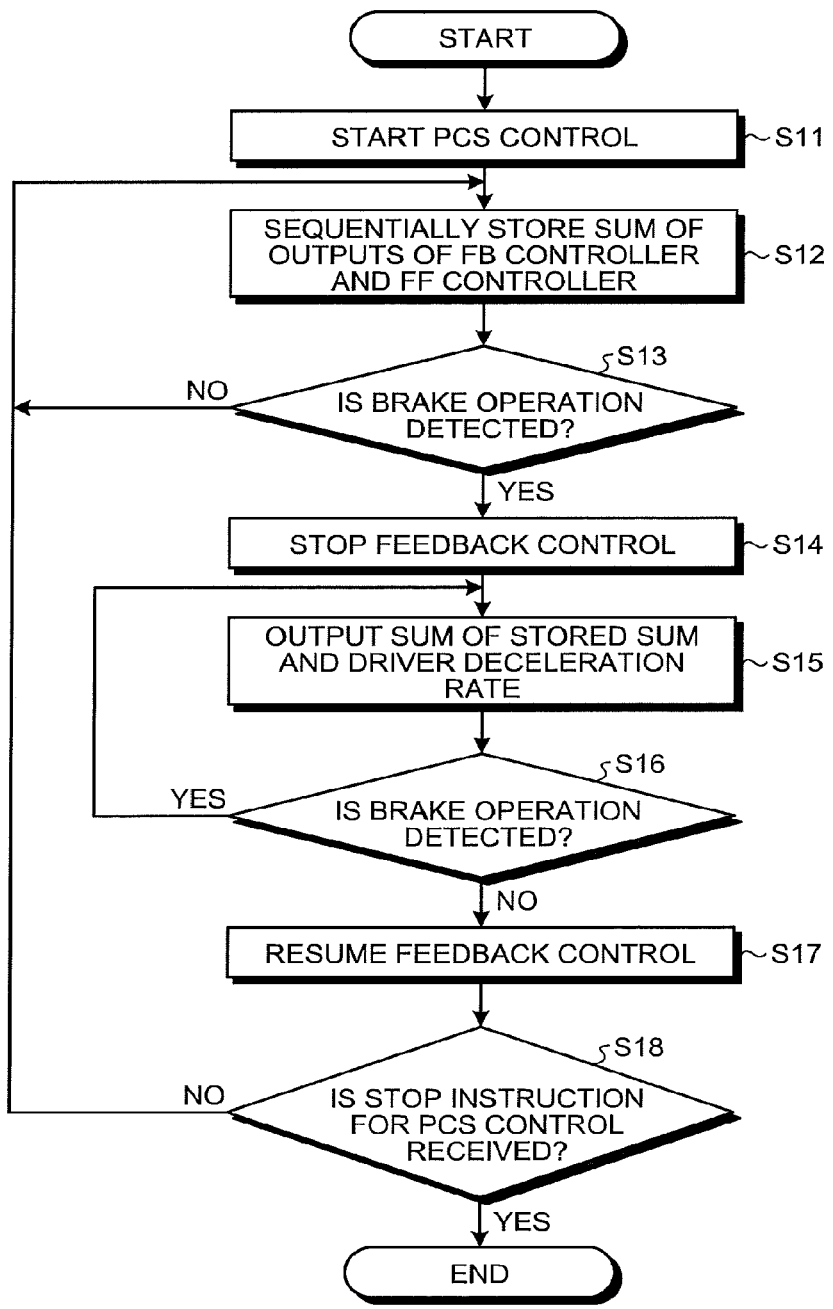
FIG. 4 is a flowchart illustrating an example of the procedure of collision avoidance control processing according to a first embodiment.

Described next is collision avoidance control processing according to the present embodiment configured as described above. FIG. 4 is a flowchart illustrating an example of the procedure of the collision avoidance control processing according to the first embodiment. The PCS-ECU 10 starts collision avoidance control (PCS control) (S11). In the collision avoidance control, as described above, the PCS-ECU 10 performs feedback control and feedforward control, and the brake ECU 40 performs feedback control and feedforward control. The determination unit 45 of the brake ECU 40 sequentially stores a sum (brake target deceleration rate) of an output of the FF controller 48 and an output of the FB controller 43 in a memory and outputs the sum to the hydraulic conversion unit 44 (S12).

The determination unit 45 determines whether a brake operation performed by the driver is detected (S13). When no brake operation is detected (No at S13), the determination unit 45 repeats storing and outputting the sum of the outputs of the FF controller 48 and the FB controller 43 at S12.

When a brake operation performed by the driver is detected (Yes at S13), the brake ECU 40 stops the feedback control performed by the model deceleration rate calculation unit 47, the adder 46, and the FB controller 43 (S14). In other words, the determination unit 45 outputs a additional value of the sum (sum of the outputs of the FB controller 43 and the FF controller 48) stored in the memory at this point and the driver deceleration rate required by the driver's brake operation to the hydraulic conversion unit 44 (S15). That is, even when the outputs of the FF controller 48 and the FB controller 43 vary, the determination unit 45 does not add the varying outputs, but keeps outputting a value calculated by using the sum stored in the memory at the time of the reception of the brake operation to the hydraulic conversion unit 44.

The determination unit 45 determines whether a brake operation performed by the driver is detected (S16). While the brake operation is being detected (Yes at S16), the determination unit 45 keeps outputting the additional value of the driver deceleration rate and the sum stored in the memory at the time of the reception of the brake operation to the hydraulic conversion unit 44 at S15.

When the brake operation performed by the driver is no longer detected (No at S16), the brake ECU 40 resumes the feedback control performed by the model deceleration rate calculation unit 47, the adder 46, and the FB controller 43 (S17). In other words, the determination unit 45 sequentially stores, in the internal memory, the sum of an output indicating a deceleration rate from the FF controller 48 and an output indicating a deceleration rate from the FB controller 43 upon receiving outputs from the FF controller 48 and the FB controller 43, and transmits the sum to the hydraulic conversion unit 44.

The PCS-ECU 10 determines whether it has received a stop instruction for stopping the collision avoidance control (PCS control) from the driver (S18). When no stop instruction for stopping the collision avoidance control is received (No at S18), the processes from S12 to S18 are repeated. When a stop instruction for stopping the collision avoidance control (PCS control) is received (Yes at S18), the PCS-ECU 10 ends the processing.

In the Present embodiment as described above, when the driver performs a brake operation to cause a braking force while the collision avoidance control is being performed, the feedback control performed by the model deceleration rate calculation unit 47, the adder 46, and the FB controller 43 is stopped. In the present embodiment, when the driver performs a brake operation while the collision avoidance control is being performed, the driver deceleration rate required by the driver's brake operation is added to the deceleration rate needed for the collision avoidance control and the feedback control performed by the model deceleration rate calculation unit 47, the adder 46, and the FB controller 43 is stopped. This configuration can prevent weakening of the deceleration rate needed for avoiding collision or prevent delays in responsiveness, thereby achieving a brake performance required by the driver.

In the present embodiment, when the driver stops performing the brake operation while the feedback control performed by the model deceleration rate calculation unit 47, the adder 46, and the FB controller 43 in the brake ECU 40 is stopped, the brake ECU 40 resumes the feedback control. In the present embodiment, when the driver performs and then stops a brake operation while the collision avoidance control is being performed, the primary feedback control in the collision avoidance control is resumed, and an appropriate collision avoidance control can be implemented.

Second Embodiment

In the first embodiment, the feedback control performed by the model deceleration rate calculation unit 47, the adder 46, and the FB controller 43 in the brake ECU 40 is stopped when the driver performs a brake operation to cause a braking force while the PCS control is being performed.

In some cases, the driver performs a brake operation to cause a braking force while the PCS control is being performed but if the brake pedal is not sufficiently operated, the brake operation causes a small driver deceleration rate. In such a case, stopping of the feedback control performed by the model deceleration rate calculation unit 47, the adder 46, and the FB controller 43 in the brake ECU 40 may lead to an insufficient desired deceleration rate for controlling the brake device 41 and results in an insufficient vehicle deceleration rate.

According to a second embodiment, when the driver performs a brake operation to cause a braking force while the collision avoidance control is being performed, the brake ECU 40 outputs the greater one of a desired deceleration rate generated by applying the vehicle deceleration rate as feedback to the PCS desired deceleration rate, that is, the brake target deceleration rate and a desired deceleration rate required by the driver's brake operation. This configuration further ensures avoiding collision even when the braking force caused by a driver's is a small braking force while the collision avoidance control is being performed.

The configurations of the vehicle 100, the PCS-ECU 10, and the brake ECU 40 according to the present embodiment are the same as those in the first embodiment.

The determination unit 45 of the brake ECU 40 according to the present embodiment calculates, upon detection of a brake operation, a driver deceleration rate (an example of a second desired deceleration rate) that is a desired deceleration rate required by the brake operation. The determination unit 45 compares the calculated driver deceleration rate with a deceleration rate generated by applying the vehicle deceleration rate as feedback to the PCS desired deceleration rate, that is, a brake target deceleration rate (an example of a third desired deceleration rate), and outputs the greater one of the compared deceleration rates to the hydraulic conversion unit 44 to control the brake device 41. The deceleration rate (brake target deceleration rate) generated by applying the vehicle deceleration rate as feedback to the PCS desired deceleration rate corresponds to a sum of the outputs of the FF controller 48 and the FB controller 43.

More specifically, when the driver deceleration rate is greater than the brake target deceleration rate, the brake ECU 40 stops the feedback control performed by the model deceleration rate calculation unit 47, the adder 46, and the FB controller 43, and outputs the driver deceleration rate to the hydraulic conversion unit 44.

When the brake target deceleration rate is equal to or greater than the driver deceleration rate, the brake ECU 40 resumes the feedback control performed by the model deceleration rate calculation unit 47, the adder 46, and the FB controller 43, and outputs the brake target deceleration rate to the hydraulic conversion unit 44.

Figure 5:
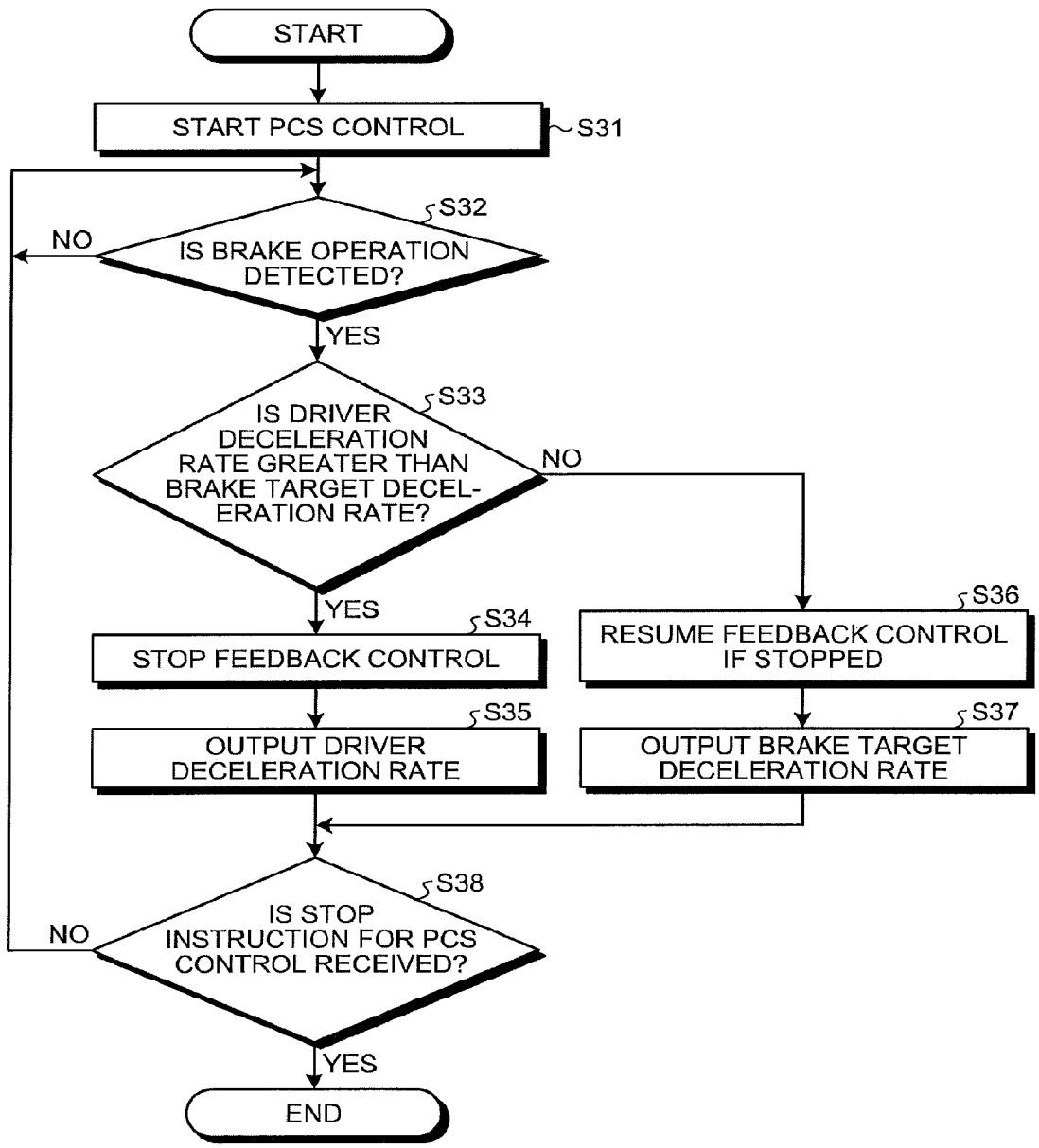
FIG. 5 is a flowchart illustrating an example of the procedure of collision avoidance control processing according to a second embodiment.

Described next is collision avoidance control processing according to the present embodiment configured as described above. FIG. 5 is a flowchart illustrating an example of the procedure of the collision avoidance control processing according to the second embodiment. The PCS-ECU 10 starts collision avoidance control (PCS control) (S31). In the collision avoidance control (PCS control), as described above, the PCS-ECU 10 performs feedback control and feedforward control, and the brake ECU 40 performs feedback control and feedforward control. In the same manner as in the first embodiment, the determination unit 45 of the brake ECU 40 sequentially stores, in the memory, a sum of the outputs of the FF controller 48 and the FB controller 43, which is a deceleration rate generated by applying the vehicle deceleration rate as feedback to the PCS desired deceleration rate, that is, the brake target deceleration rate, and outputs the sum to the hydraulic conversion unit 44.

Subsequently, the determination unit 45 determines whether a brake operation performed by the driver is detected (S32). When no brake operation is detected (No at S32), the determination unit 45 repeats storing and outputting the sum of the outputs of the FF controller 48 and the FB controller 43.

When a brake operation performed by the driver is detected (Yes at S32), the determination unit 45 calculates the driver deceleration rate and determines whether the driver deceleration rate is greater than the brake target deceleration rate (S33). When the driver deceleration rate is greater than the brake target deceleration rate (Yes at S33), the brake ECU 40 stops the feedback control performed by the model deceleration rate calculation unit 47, the adder 46, and the FB controller 43 (S34), and the determination unit 45 outputs the driver deceleration rate to the hydraulic conversion unit 44 (S35).

When, at S33, the brake target deceleration rate is equal to or greater than the driver deceleration rate (No at S33), the brake ECU 40 resumes the feedback control, if stopped, performed by the model deceleration rate calculation unit 47, the adder 46, and the FB controller 43 (S36), and the determination unit 45 outputs the brake target deceleration rate to the hydraulic conversion unit 44 as the brake target deceleration rate (S37).

The PCS-ECU 10 determines whether it has received a stop instruction for stopping the collision avoidance control (PCS control) from the driver (S38). When no stop instruction for stopping the collision avoidance control is received (No at S38), processes from S32 to S38 are repeated. When a stop instruction for stopping the collision avoidance control is received (Yes at S38), the PCS-ECU 10 ends the processing.

Figure 6:
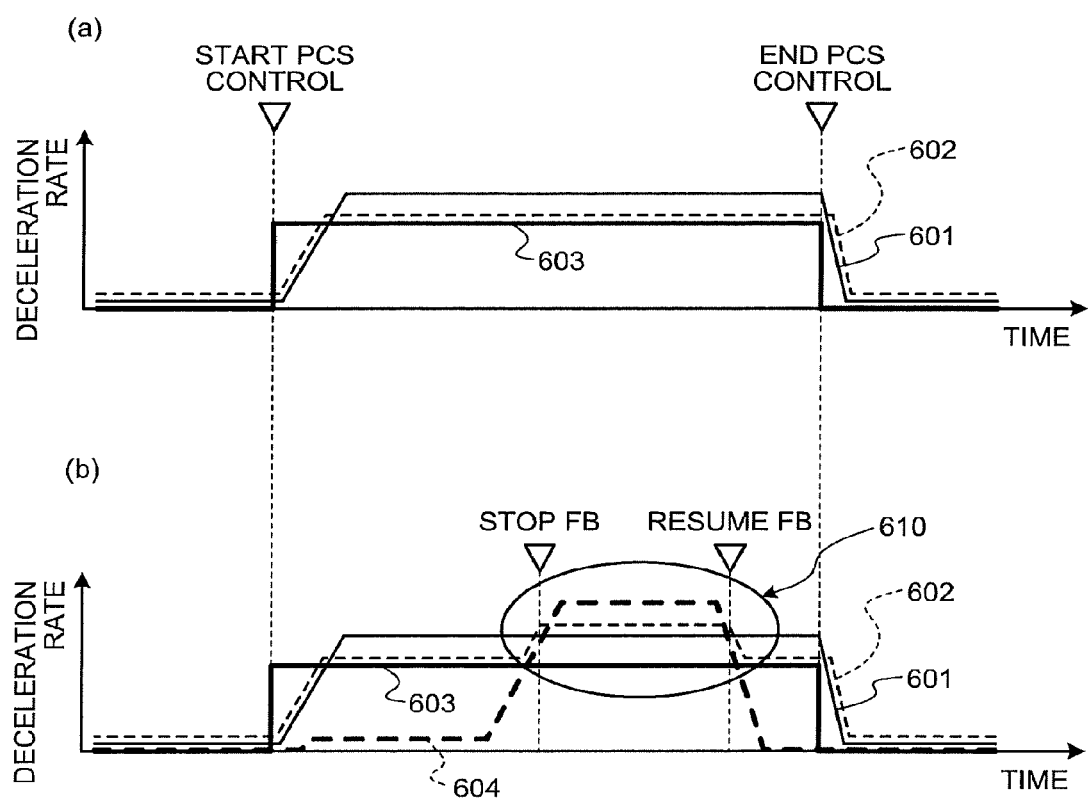
FIG. 6 is a diagram illustrating changes in deceleration rates in the second embodiment.

FIG. 6 is a diagram illustrating changes in deceleration rates in the second embodiment. FIG. 6(a) illustrates a case with no brake operation performed by the driver and FIG. 6(b) illustrates a case with a brake operation performed by the driver. In FIG. 6, the horizontal axis represents time and the vertical axis represents the magnitude of deceleration rates. Reference numeral 601 indicates a change in the brake target deceleration rate. Reference numeral 602 indicates a change in the vehicle deceleration rate of the vehicle 100. Reference numeral 603 indicates the PCS desired deceleration rate. Reference numeral 604 indicates the driver deceleration rate required by a brake operation. Reference numeral 610 indicates a period in which the feedback control performed by the model deceleration rate calculation unit 47, the adder 46, and the FB controller 43 in the brake ECU 40 is stopped.

As illustrated in FIG. 6(*a*), upon starting of the PCS control, the PCS-ECU 10 outputs a PCS desired deceleration rate 603. In accordance with the PCS desired deceleration rate 603, the brake ECU 40 outputs a brake target deceleration rate 601 greater than the PCS desired deceleration rate 603. As a result, the vehicle deceleration rate 602 of the vehicle 100 becomes substantially the same level as that of the PCS desired deceleration rate 603.

Suppose that, as illustrated in FIG. 6(*b*), the driver performs a brake operation while the PCS control is being performed and causes a driver deceleration rate 604. When the driver deceleration rate 604 is small, not exceeding the brake target deceleration rate 601, the brake ECU 40 does not stop the feedback control performed by the model deceleration rate calculation unit 47, the adder 46, and the FB controller 43 and continues the feedback control. The determination unit 45 thus outputs the brake target deceleration rate 601 to the hydraulic conversion unit 44. When the driver deceleration rate 604 increases and exceeds the brake target deceleration rate 601, which is referred to as a point of "stop FB", the brake ECU 40 stops the feedback control performed by the model deceleration rate calculation unit 47, the adder 46, and the FB controller 43, and consequently, the determination unit 45 outputs the driver deceleration rate 604 to the hydraulic conversion unit 44 instead of the brake target deceleration rate 601. When the driver deceleration rate 604 decreases and falls below the brake target deceleration rate 601, which is referred to as a point of "resume FB", the brake ECU 40 resumes the feedback control performed by the model deceleration rate calculation unit 47, the adder 46, and the FB controller 43. The determination unit 45 thus outputs the brake target deceleration rate 601 to the hydraulic conversion unit 44. Because the feedback control is stopped while the driver deceleration rate 604 is selected, the brake target deceleration rate 601 will not be reduced by the feedback control during the driver deceleration rate 604 being greater than the brake target deceleration rate 601 is selected, and thus, an appropriate control can be achieved at the time of resuming the feedback control.

In the present embodiment, when the driver performs a brake operation to cause a braking force while the collision avoidance control is being performed, the brake ECU 40 controls the brake device 41 by using the greater one of the brake target deceleration rate and the driver deceleration rate required by the driver's brake operation. In the present embodiment, because a braking force is applied by a brake operation while the collision avoidance control is being performed, even when the feedback control performed by the model deceleration rate calculation unit 47, the adder 46, and the FB controller 43 is stopped, the desired deceleration rate for controlling the brake device 41 will not be reduced, thereby preventing decrease in the vehicle deceleration rate. This configuration in the present embodiment ensures avoiding collision with an obstacle if a small braking force is applied by the driver's brake operation while the collision avoidance control is being performed.

In the first embodiment, the determination unit 45 stores therein the sum of the outputs of the FB controller 43 and the FF controller 48, and upon detection of a brake operation, the determination unit 45 adds the stored sum of the outputs of the FB controller 43 and the FF controller 48 and the driver deceleration rate and outputs the additional value to the hydraulic conversion unit 44. The determination unit 45, however, may store therein only the output of the FB controller 43, and upon detection of a brake operation, the determination unit 45 may add the stored output of the FB controller 43, the latest output of the FF controller 48, and the driver deceleration rate, and may output the additional value to the hydraulic conversion unit 44. In this case, the latest output of the FF controller 48 varies in accordance with the changes in the PCS desired deceleration rate from the PCS-ECU 10 during the brake operation, and thus, the changes in the PCS desired deceleration rate can be applied while the feedback control is activated.

While the present invention has been described in conjunction with some embodiments, these embodiments are presented for illustrative purposes only and are not intended to limit the scope of the present invention. These novel embodiments can be implemented in various other forms, and various omissions, substitutions, or modifications to the embodiments can be made without departing from the spirit of the present invention. The embodiments and modifications thereof are encompassed within the scope and spirit of the present invention and contained in the appended claims and equivalents thereof.

EXPLANATIONS OF LETTERS OR NUMERALS

10 . . . PCS-ECU (collision avoidance control unit), 40 . . . Brake ECU (brake control unit), 41 . . . Brake device

The invention claimed is:

1. A vehicular collision avoidance control device comprising:
   a collision avoidance control unit configured to:
   receive a vehicle deceleration rate that is an actual deceleration rate of a traveling vehicle, and
   obtain a first desired deceleration rate for avoiding collision with an obstacle based on the received vehicle deceleration rate, a relative distance to the obstacle, and a target relative distance; and
   a brake control unit configured to:
   obtain a desired deceleration rate for controlling a brake device by performing first control that is a feedback control that is based on the received vehicle deceleration rate and the first desired deceleration rate, and
   performing second control that is a feedforward control that is based on the first desired deceleration rate and excludes feedback based upon the received vehicle deceleration rate, and stop the first control upon detection of a brake operation performed by a driver.

2. The vehicular collision avoidance control device according to claim 1, wherein, when the brake operation is no longer detected, the brake control unit resumes the first control.

3. The vehicular collision avoidance control device according to claim 1, wherein, upon detection of the brake operation, the brake control unit:
   compares a second desired deceleration rate that is a desired deceleration rate required by the brake operation with a third desired deceleration rate that is a deceleration rate generated by applying the vehicle deceleration rate as feedback to the first desired deceleration rate, and controls the brake device by using a greater one of the second desired deceleration rate and the third desired deceleration rate.

4. A vehicular collision avoidance control method comprising:
receiving a vehicle deceleration rate that is an actual deceleration rate of a traveling vehicle;
obtaining a first desired deceleration rate for avoiding collision with an obstacle based on the received vehicle deceleration rate, a relative distance to the obstacle, and a target relative distance;
obtaining a desired deceleration rate for controlling a brake device by performing first control that is a feedback control that is based on the received vehicle deceleration rate and the first desired deceleration rate, and
performing second control that is a feedforward control that is based on the first desired deceleration rate and excludes feedback based upon the received vehicle deceleration rate; and
stopping the first control upon detection of a brake operation performed by a driver.

5. A vehicular collision avoidance control device comprising: circuitry configured to:
receive a vehicle deceleration rate that is an actual deceleration rate of a traveling vehicle;
obtain a first desired deceleration rate for avoiding collision with an obstacle based on the received vehicle deceleration rate, a relative distance to the obstacle, and a target relative distance;
obtain a desired deceleration rate for controlling a brake device by performing first control that is a feedback control that is based on the received vehicle deceleration rate and the first desired deceleration rate, and
performing second control that is a feedforward control that is based on the first desired deceleration rate and excludes feedback based upon the received vehicle deceleration rate; and
stop the first control upon detection of a brake operation performed by a driver.

* * * * *